(12) United States Patent
Suyama et al.

(10) Patent No.: US 12,381,379 B2
(45) Date of Patent: Aug. 5, 2025

(54) JOINING STRUCTURE, METHOD OF PRODUCING SAME, AND WIRE EXTERIOR COVER

(71) Applicants: FURUKAWA ELECTRIC CO., LTD., Tokyo (JP); FURUKAWA AUTOMOTIVE SYSTEMS INC., Inukami-gun (JP)

(72) Inventors: Hiroshi Suyama, Tokyo (JP); Takashi Oshino, Tokyo (JP); Naoyuki Kojima, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 187 days.

(21) Appl. No.: 18/324,512

(22) Filed: May 26, 2023

(65) Prior Publication Data

US 2023/0299569 A1  Sep. 21, 2023

Related U.S. Application Data

(63) Continuation of application No. PCT/JP2022/001138, filed on Jan. 14, 2022.

(30) Foreign Application Priority Data

Jan. 20, 2021 (JP) ................. 2021-007328

(51) Int. Cl.
*H02G 3/04* (2006.01)
*B29C 65/00* (2006.01)
*B29C 65/08* (2006.01)

(52) U.S. Cl.
CPC .......... *H02G 3/0487* (2013.01); *B29C 65/08* (2013.01); *B29C 66/114* (2013.01); *B29C 66/727* (2013.01); *B29C 66/81422* (2013.01)

(58) Field of Classification Search
CPC ...... H02G 3/0487; B29C 65/08; B29C 65/114
See application file for complete search history.

(56) References Cited

U.S. PATENT DOCUMENTS

| 5,171,958 A | * | 12/1992 | Yamaguchi | ........ | B23K 35/3073 |
| | | | | | 219/137 WM |
| 2014/0124489 A1 | * | 5/2014 | Zhang | .................. | B23K 26/348 |
| | | | | | 219/137 R |
| 2021/0027916 A1 | | 1/2021 | Mizuno et al. | | |

FOREIGN PATENT DOCUMENTS

| JP | 51-50374 A | 5/1976 |
| JP | 59-109317 A | 6/1984 |

(Continued)

OTHER PUBLICATIONS

International Search Report issued Mar. 8, 2022 in PCT/JP2022/001138 filed on Jan. 14, 2022, 2 pages.

*Primary Examiner* — Paresh Paghadal
(74) *Attorney, Agent, or Firm* — Oblon, McClelland, Maier & Neustadt, L.L.P.

(57) ABSTRACT

A joining structure, a method of producing same and a wire exterior cover using the joining structure. The joining structure comprises a joining part formed by butt-welding a plate surface part of a first resin plate made of a first resin, and an end surface part of a second resin plate made of a second resin. In the joining structure, a foam resin is used for the first resin and a foam resin or a non-foam resin is used for the second resin. The joining part has a welding recess in a surface of the plate surface part. In an internal corner of a reverse surface, there is a padding section formed by melt-flowing and solidifying of at least the first resin out of the first resin and the second resin.

11 Claims, 9 Drawing Sheets

(56) References Cited

FOREIGN PATENT DOCUMENTS

| | | |
|---|---|---|
| JP | 2014-51053 A | 3/2014 |
| JP | 2019-13107 A | 1/2019 |
| JP | 2019-179630 A | 10/2019 |
| JP | 2020-89041 A | 6/2020 |

* cited by examiner

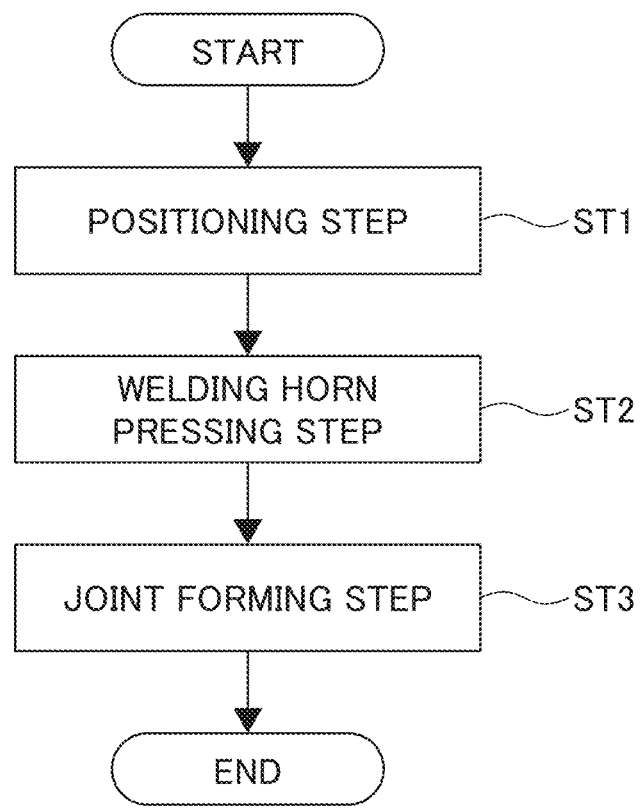

JOINING STRUCTURE, METHOD OF PRODUCING SAME, AND WIRE EXTERIOR COVER

TECHNICAL FIELD

The present invention relates to a joining structure, a method for producing the joining structure, and an electrical wire sheath.

BACKGROUND ART

An electrical wire sheath is used around a wire harness, which is routed in a vehicle or the like, to protect the wire harness from external forces. Such an electrical wire sheath is designed to cover the circumference of the electrical wire and thus to protect the electrical wire from external forces.

Examples of such an electrical wire sheath for protecting a wire harness include those disclosed in Patent Documents 1 and 2, which include a thermoplastic resin foam sheet folded to form a tubular housing, which is to be provided around an electrical wire.

Specifically, the electrical wire sheath disclosed in Patent Document 1 includes multiple walls that extend along the longitudinal direction of the electrical wire and form a housing for the electrical wire, in which the multiple walls include an outer sheath wall, an inner sheath wall overlapped and joined with the outer sheath wall, and side walls extending from both ends of the inner sheath wall to support the inner sheath wall.

The electrical wire sheath disclosed in Patent Document 2 includes walls that form a housing and include a first wall having protrusions and a second wall having holes. The housing is formed by deforming at least the protrusions or the holes and inserting the protrusions into the holes to engage the first and second walls with each other.

Patent Document 1: Japanese Unexamined Patent Application, Publication No. 2019-13107
Patent Document 2: Japanese Unexamined Patent Application, Publication No. 2020-89041

DISCLOSURE OF THE INVENTION

Problems to be Solved by the Invention

The electrical wire sheaths disclosed in Patent Documents 1 and 2 each include a resin sheet, such as a thermoplastic resin foam sheet, which has surfaces overlapped and joined together to form a tubular housing or has protrusions and holes engaged together to form a tubular housing.

In this regard, it is desirable in terms of reducing material costs, if possible, to join parts of a resin sheet together without overlapping between its principal surfaces, because in such a case, the resin sheet necessary to form a joining structure, such as an electrical wire sheath, may have a reduced surface area. It is also desirable in terms of improving work efficiency, if possible, to join parts of a resin sheet together without formation of any protrusion or hole on or in the resin sheet, because in such a case, a joining structure, such as an electrical wire sheath, can be formed through a reduced number of working steps.

This applies not only to electrical wire sheaths but also to other joining structures, such as a joining structure including first and second resins joined together, in which the first resin includes a foamed resin, and the second resin includes a non-foamed or foamed resin.

It is an object of the present invention to provide a joining structure that can be formed by joining resin sheets with high work efficiency without using excessive portions of the resin sheets for the joint, to provide a method for producing such a joining structure, and to provide an electrical wire sheath including such a joining structure.

Means for Solving the Problems

The inventors have made a joining structure including: a first resin sheet including a first resin; a second resin sheet including a second resin; and a joint formed by mating and welding a principal surface portion of the first resin sheet and an end surface portion of the second resin sheet, in which the joint has a weld recess on a top surface of the first resin sheet and includes a weld overlay portion formed at the inside corner on a bottom surface of the first resin sheet by allowing, out of the first and second resins, at least the first resin to melt, flow, and solidify, and have completed the present invention based on findings that such a joining structure can be formed by joining the resin sheets with high work efficiency without overlapping between principal surfaces of the resin sheets.

Specifically, the present invention has the following technical features.

(1) A joining structure including: a first resin sheet including a first resin; a second resin sheet including a second resin; and a joint formed by mating and welding a principal surface portion of the first resin sheet and an end surface portion of the second resin sheet, the first resin being a foamed resin, the second resin being a non-foamed or foamed resin, the joint having a weld recess on a top surface and including a weld overlay portion formed at an inside corner on a bottom surface by allowing, out of the first and second resins, at least the first resin to melt, flow, and solidify.

(2) The joining structure according to aspect (1), in which the first resin in the joint has a minimum thickness in the range of 0.1 mm or more and 2.0 mm or less as measured at the bottom of the weld recess.

(3) The joining structure according to aspect (1) or (2), in which the joint has a minimum thickness of 0.1 mm or more as measured from the weld recess.

(4) The joining structure according to any one of aspects (1) to (3), in which the principal surface portion of the first resin sheet and the end surface portion of the second resin sheet are mated together at an angle in the range of 45° or more and 90° or less as measured on the acute angle side.

(5) The joining structure according to any one of aspects (1) to (4), in which one or both of the first and second resins include a polypropylene resin.

(6) An electrical wire sheath to be provided around an electrical wire, the electrical wire sheath including the joining structure according to any one of aspects (1) to (5).

(7) A sheathed wire harness including: a wire harness; and the electrical wire sheath according to aspect (6) that is provided around the wire harness.

(8) A method for producing a joining structure, the method including: a positioning step including mating and positioning a bottom surface of a principal surface portion of a first resin sheet including a first resin and an end surface portion of a second resin sheet including a second resin; a welding horn pressing step including pressing a leading end of a welding horn against a top surface of the principal surface portion of the first resin sheet while the principal surface portion of the first resin sheet is mated with the end surface portion of the second resin sheet; and a joint forming step including welding the principal surface portion of the first resin sheet and the end surface portion of the second resin sheet, which are mated together, to form a joint using ultrasound emitted from the welding horn, in which the first resin is a foamed resin, the second resin is a non-foamed or foamed resin, and the joint has a weld recess on the top surface and includes a weld overlay portion formed at an inside corner on the bottom surface by allowing, out of the first and second resins, at least the first resin to melt, flow, and solidify.

(9) The method according to aspect (8) for producing a joining structure, in which the leading end of the welding horn has a convex protrusion shape.

(10) The method according to aspect (8) or (9) for producing a joining structure, in which the leading end of the welding horn has a surface curved at least partially.

(11) The method according to any one of aspects (8) to (10) for producing a joining structure, in which the leading end of the welding horn has a surface at least part of which has multiple bumps and dents.

Effects of the Invention

The present invention makes it possible to provide a joining structure that can be formed by joining resin sheets with high work efficiency without using excessive portions of the resin sheets for the joint, to provide a method for producing such a joining structure, and to provide an electrical wire sheath including such a joining structure.

BRIEF DESCRIPTION OF THE DRAWINGS

FIGS. 1A and 1B are schematic views of the major portion (including a joint) of a joining structure, in which FIG. 1A is a plan view and FIG. 1B is an a-a sectional view (cross-sectional view) of FIG. 1A;

FIGS. 2A, 2B, and 2C are schematic plan views of weld recesses in joints constituting joining structures according to different embodiments, in which FIG. 2A shows a case where the bottom of the weld recess has bumps and dents in a stripe pattern, FIG. 2B shows a case where the bottom of the weld recess has bumps and dents in an irregular pattern, and FIG. 2C shows a case where the bottom of the weld recess has a flat surface;

FIGS. 4A and 4B are schematic views of the major portion (including a joint) of joining structures according to other embodiments, in which FIG. 4A shows a case where the weld overlay portion of the joint has a concave surface when the inside corner is viewed, and FIG. 4B shows a case where the weld overlay portion of the joint has a convex surface when the inside corner is viewed;

FIG. 6 is a flowchart of a method for producing a joining structure;

FIGS. 8A, 8B, and 8C are schematic diagrams each showing an example of the geometry of the leading end of a welding horn for use in a method for producing a joining structure according to another embodiment, in which FIG. 8A shows a case where the leading end of the welding horn has bumps and dents formed by knurling, FIG. 8B shows a case where the leading end of the welding horn has a convex protrusion with top surface irregularities formed by blasting, and FIG. 8C shows a case where the leading end of the welding horn has a convex protrusion with a convex top surface formed by filleting.

PREFERRED MODE FOR CARRYING OUT THE INVENTION

Next, joining structures and electrical wire sheaths according to some embodiments of the present invention will be described below.

Figure 1A:
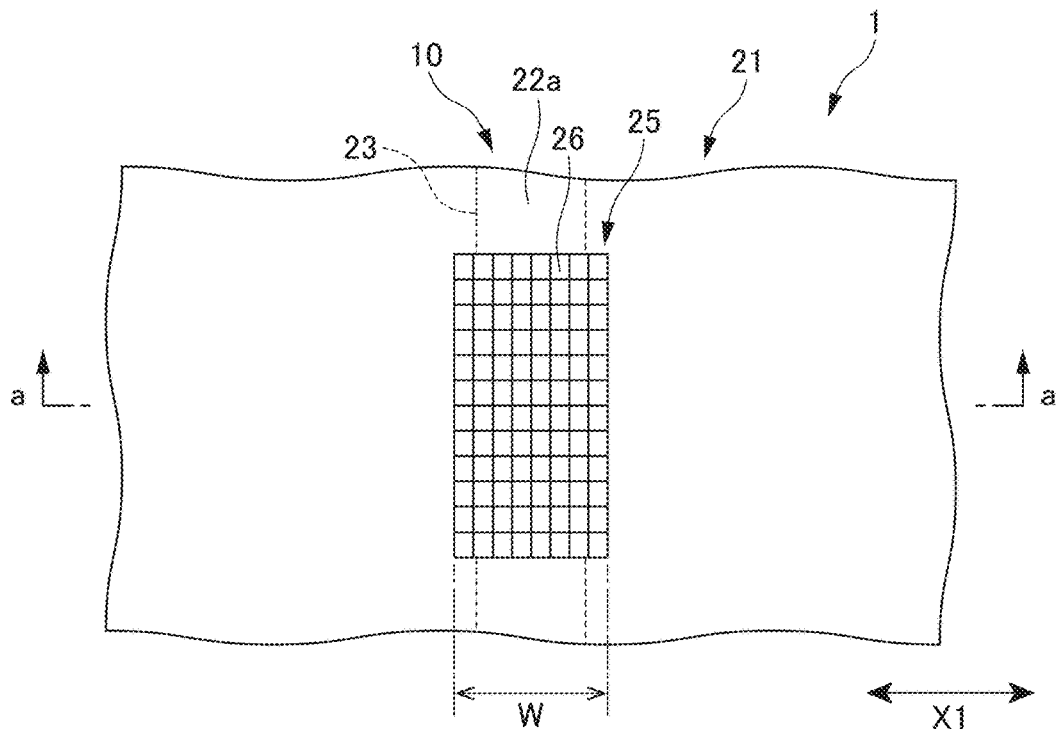
Figure 1B:
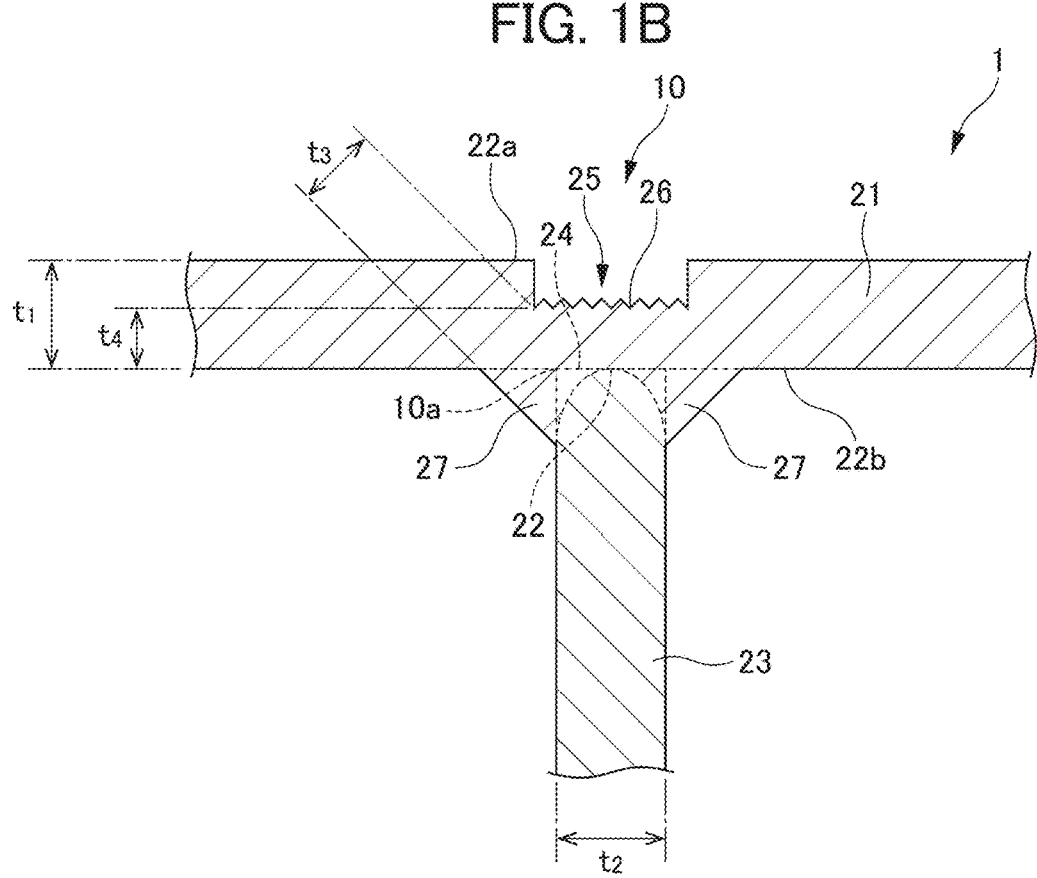
Figure 2A:
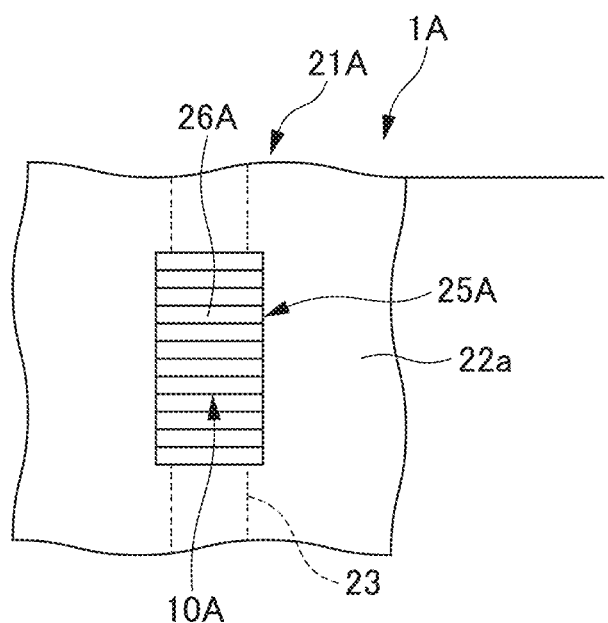
Figure 2B:
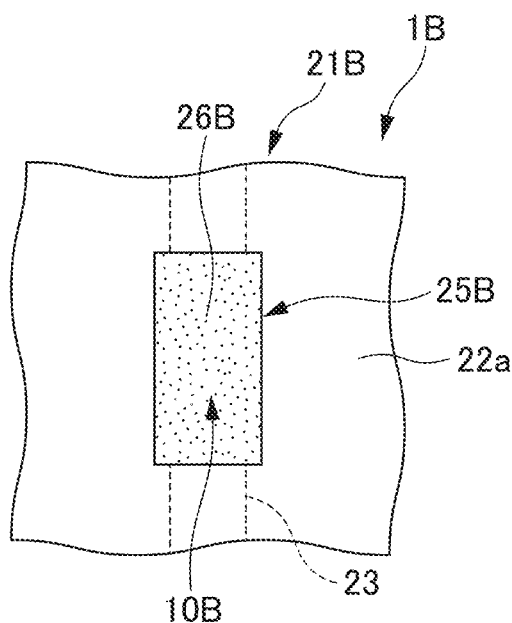
Figure 2C:
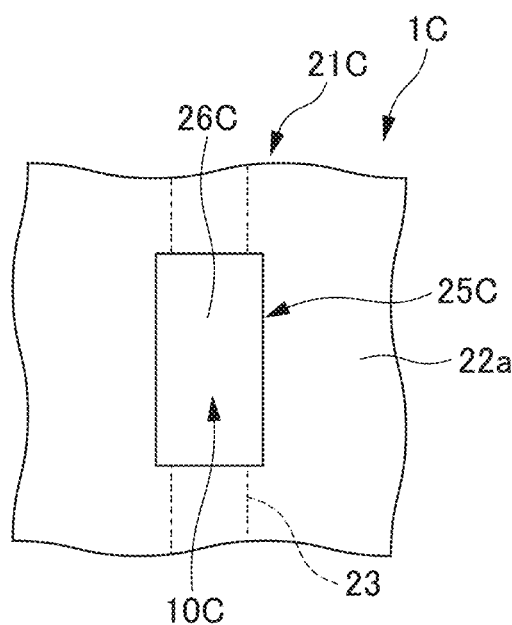
Figure 3:
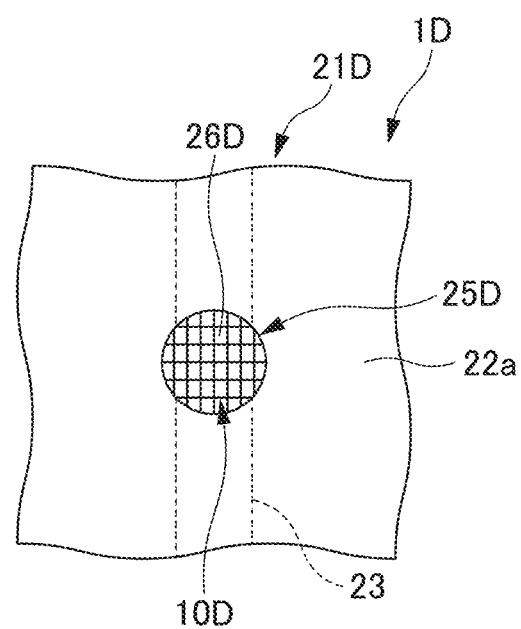
FIG. 3 is a plan view of the geometry of a weld recess in the joint of a joining structure according to another embodiment.
Figure 4A:
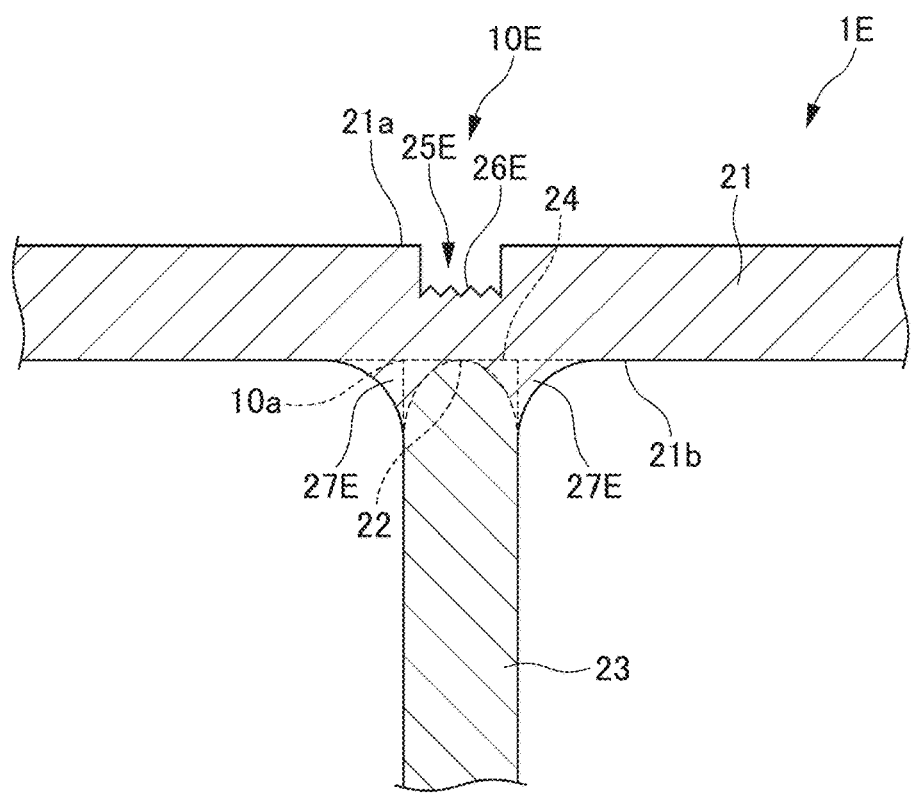
Figure 4B:
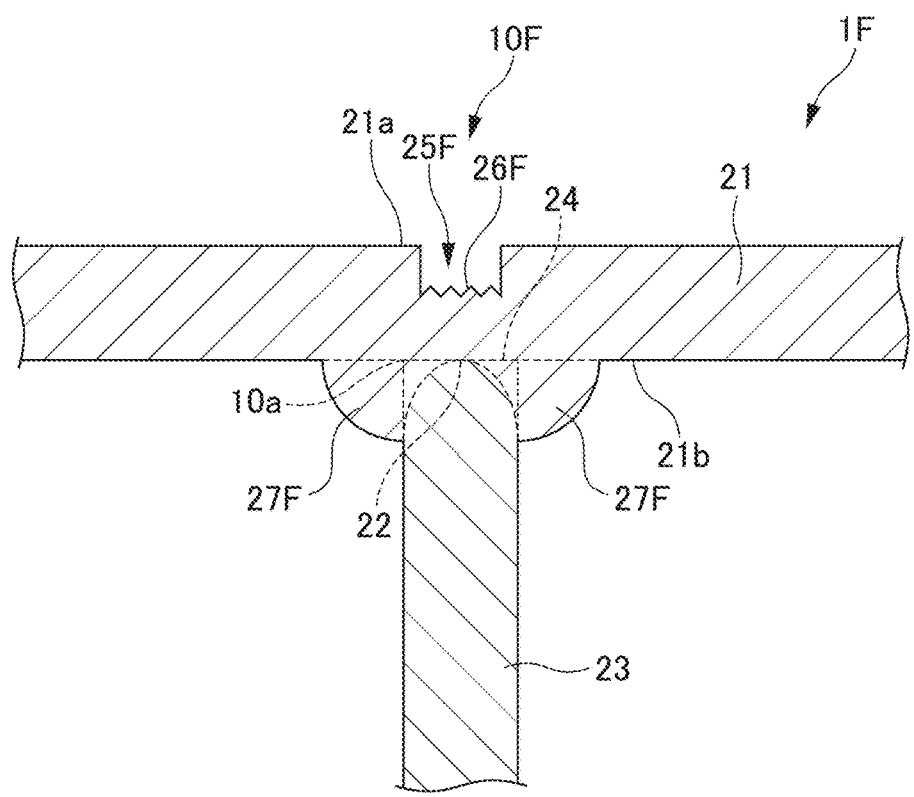

FIGS. 1A and 1B are schematic views of the major portion (including a joint) of a joining structure, in which FIG. 1A is a plan view and FIG. 1B is an a-a sectional view (cross-sectional view) of FIG. 1A. FIGS. 2A, 2B, and 2C are schematic plan views of weld recesses in joints constituting joining structures according to different embodiments, in which FIG. 2A shows a case where the bottom of the weld recess has bumps and dents in a stripe pattern, FIG. 2B shows a case where the bottom of the weld recess has bumps and dents in an irregular pattern, and FIG. 2C shows a case where the bottom of the weld recess has a flat surface. FIG. 3 is a plan view of the geometry of a weld recess in the joint of a joining structure according to another embodiment. FIGS. 4A and 4B are schematic views of the major portion (including a joint) of joining structures according to other embodiments, in which FIG. 4A shows a case where the weld overlay portion of the joint has a concave surface when the inside corner is viewed, and FIG. 4B shows a case where the weld overlay portion of the joint has a convex surface when the inside corner is viewed.

1. Joining Structure

FIG. 1 shows a joining structure 1 including: a first resin sheet 21 including a first resin; a second resin sheet 23 including a second resin; and a joint 10 formed by mating and welding a principal surface portion 22 of the first resin sheet 21 and an end surface portion 24 of the second resin sheet 23. In the joining structure 1, the first resin is a foamed resin, and the second resin is a non-foamed resin (solid resin) or a foamed resin. The joint 10 has a weld recess 25 on the top surface 22a of the principal surface portion 22 of the first resin sheet 21. The joint 10 includes a weld overlay portion 27 formed at the inside corner 10a on the bottom surface 22b of the principal surface portion 22 by allowing, out of the first and second resins, at least the first resin to melt, flow, and solidify.

Thus, when the weld recess 25 is formed on the top surface 22a of the principal surface portion 22 of the first resin sheet 21, the first resin is pushed in the depth direction of the weld recess 25, allowed to melt and flow in the vicinity of the end surface portion 24 of the second resin sheet 23, and welded to the end surface portion 24 of the second resin sheet 23. As a result, the end surface portion 24 of the second resin sheet 23 is joined to the principal surface portion 22 of the first resin sheet 21 with a relatively large joint area provided between them. In particular, not only the first resin, which forms the principal surface portion 22 of the first resin sheet 21, but also the second resin, which forms the end surface portion 24 of the second resin sheet 23, can be melted to form a layer of a mixture of the first and second resins at the boundary between the first and second resin sheets 21 and 23. In this way, the first and second resin sheets 21 and 23 can be joined together by welding. Thus, the first and second resin sheets 21 and 23 can be joined together by welding without joining principal surfaces of the first and second resin sheets 21 and 23, which means that the first and second resin sheets 21 and 23 can be joined together without using excessive portions of the resin sheets and that the resin sheets can be joined with high work efficiency when the joining structure 1 is produced.

As used herein, the term "welding" refers to plastic welding. In an embodiment of the present invention, the plastic welding is preferably ultrasonic plastic welding. The term "plastic welding" refers to a technique that includes heating multiple resin sheets including thermoplastic resin to above their melting point to bond them together or heating multiple portions of a single resin sheet to above the melting point to bond them together. The term "ultrasonic welding" refers to a technique that includes melting multiple resin sheets using ultrasonic vibrations and pressure to bond them together or melting multiple portions of a single resin sheet using ultrasonic vibrations and pressure to bond them together.

First and Second Resin Sheets

The first resin sheet 21 includes the first resin, and the second resin sheet 23 includes the second resin.

In this regard, parts of a single resin sheet may be used as the first and second resin sheets 21 and 23, or different resin sheets may be used as the first and second resin sheets 21 and 23. In a case where parts of a single resin sheet are used as the first and second resin sheets 21 and 23, the single resin sheet may be folded to form the first and second resin sheets 21 and 23. In this case, a middle portion of the single resin sheet may form the first resin sheet 21, and an end portion of the single resin sheet may form the second resin sheet 23. In this case, the joining structure 1 can be formed using a smaller number of components and thus can be formed with higher work efficiency.

Out of the first and second resins of the first and second resin sheets 21 and 23, at least the first resin is preferably a thermoplastic resin type, such as polyethylene resin, polypropylene resin, polycarbonate resin, polyethylene terephthalate resin, polybutylene terephthalate resin, polyamide resin, polyphenylene sulfide resin, polystyrene resin, polyvinyl chloride resin, polyvinyl acetate resin, polytetrafluoroethylene resin, or acrylic resin. Preferably, one or both of the first and second resins include polypropylene resin.

The first and second resins may include the same resin type or different resin types. Particularly in a case where the first and second resins include the same resin type, the first and second resin sheets 21 and 23 can be joined with higher strength.

Depending on the application, the first and second resins may contain any additive that is used for common resins. Examples of such an additive that may be used include, but are not limited to, one or more selected from the group consisting of a filler, an antioxidant, a stabilizer, a flame retardant, a metal deactivator, a UV absorber, a light stabilizer, a plasticizer, a nucleating agent, a compatibilizing agent, a clarifying agent, an antistatic agent, and a lubricant.

Out of the first and second resins, at least the first resin includes a foamed resin. When melted, such a foamed resin will release air bubbles and shrink, so that the melted resin area will be less likely to expand in the principal surface direction of the first or second resin sheet 21 or 23. In this case, the first resin of the first resin sheet 21 is particularly easy to push in the depth direction of the weld recess 25 being formed in the first resin sheet 21. Thus, this will facilitate the solidification of the welded resin and prevent the resin from melting and flowing more than necessary, so that the resin will be less likely to flow out of the joint 10.

As a non-limiting example, the foamed resin may have a density in the range of 200 kg/m$^3$ or more and 1,000 kg/m$^3$ or less. In particular, the density of the foamed resin is preferably 1,000 kg/m$^3$ or less, more preferably 700 kg/m$^3$ or less, even more preferably 500 kg/m$^3$ or less for the purpose of providing light weight and high mechanical impact-absorbing ability to application products using the joining structure 1, such as electrical wire sheaths and sheathed wire harnesses. On the other hand, the density of the foamed resin is preferably 200 kg/m$^3$ or more for the purpose of ensuring the mechanical strength of the foamed resin and facilitating the melting and flowing of the foamed resin during the formation of the weld recess 25.

On the other hand, the second resin of the second resin sheet 23 may include a non-foamed resin or may include a foamed resin as described above. Particularly in a case where the second resin includes a non-foamed resin, the first and second resin sheets 21 and 23 can be joined with higher strength.

The thickness $t_1$ of the first resin sheet 21 and the thickness $t_2$ of the second resin sheet 23 are each preferably, but not limited to, 0.5 mm or more and 5.0 mm or less, more preferably 1.0 mm or more and 2.0 mm or less, for example, for the purpose of improving the balance between mechanical strength and ease of welding through the formation of the weld recess 25.

Joint

The joining structure 1 includes the first resin sheet 21 including the first resin; the second resin sheet 23 including the second resin; and the joint 10 formed by mating and welding the principal surface portion 22 of the first resin sheet 21 and the end surface portion 24 of the second resin sheet 23. In this structure, as shown in FIG. 1B, the joint 10 is a portion formed by mating and welding the bottom surface (lower side surface in FIG. 1B) of the principal surface portion 22 of the first resin sheet 21 and the end surface portion 24 of the second resin sheet 23.

The joint 10 has a weld recess 25, which is located on the top surface 22a of the principal surface portion 22 of the first resin sheet 21. In this structure, the top surface 22a of the principal surface portion 22 is on the side opposite to the side where the end surface portion 24 of the second resin sheet 23 abuts the first resin sheet 21. At the weld recess 25 in the joint 10, at least the first resin of the first resin sheet 21 has been pushed in the depth direction of the weld recess 25 and allowed to melt and flow in the vicinity of the end surface portion 24 of the second resin sheet 23 so that the flowing resin melt has been fused to the end surface portion 24 of the second resin sheet 23 to form a weld overlay portion 27, which will be described later. The resin that is allowed to melt and flow during the formation of the weld recess 25 may include the second resin in addition to the first resin.

The bottom 26 of the weld recess 25 may include a non-foamed resin. Specifically, the first resin often melts at the bottom 26 of the weld recess 25 when the first resin is pushed in the depth direction of the weld recess 25 and allowed to melt and flow in the vicinity of the end surface portion 24 of the second resin sheet 23. This often results in the formation of a non-foamed resin at the bottom 26 of the weld recess 25.

In the structure, the width w of the bottom 26 of the weld recess 25 in the thickness direction of the second resin sheet 23 (the X1 direction in FIG. 1A) is preferably equal to or greater than the thickness $t_2$ of the second resin sheet 23. In this case, the bottom 26 of the weld recess 25 is preferably formed to cover the positions of both principal surfaces of the second resin sheet 23 as viewed in the thickness direction (X1 direction) of the second resin sheet 23. The width w of the bottom 26 of the weld recess 25 is also preferably greater than the thickness $t_2$ of the second resin sheet 23 by more than 0 mm to 1.0 mm. When the weld recess 25 is formed in such a manner, the resin pushed in the depth direction of the weld recess 25 will be easily allowed to melt and flow in the vicinity of the end surface portion 24 of the second resin sheet 23. Alternatively, the width w of the bottom 26 of the weld recess 25 may be smaller than the thickness $t_2$ of the second resin sheet 23.

The surface of the bottom 26 of the weld recess 25 may be shaped to have bumps and dents in a grid pattern, for example, as shown in FIG. 1A. Such bumps and dents in a grid pattern may be formed by pressing a diamond-knurled, leading end of a welding horn against the top surface 22a of the principal surface portion 22 of the first resin sheet 21 as described later. This allows the resin to be easily pushed in the depth direction of the weld recess 25.

The surface geometry of the bottom 26 of the weld recess 25 should not be limited to the grid pattern of bumps and dents shown in FIG. 1A. For example, as shown in FIG. 2A, the bottom 26 of the weld recess 25 may be shaped to have bumps and dents in a stripe pattern using a spline-knurled, leading end of a welding horn. Alternatively, as shown in FIG. 2B, the bottom 26 of the weld recess 25 may be shaped to have bumps and dents in an irregular pattern using a blasted leading end of a welding horn. Alternatively, as shown in FIG. 2C, the bottom 26 of the weld recess 25 may be shaped to have a flat surface.

The shape of the weld recess 25 may be not only rectangular as shown in FIG. 1A but also, for example, circular as shown in FIG. 3.

As shown in FIG. 1B, the joint 10 includes a weld overlay portion 27, which is formed at the inside corner 10a on the bottom surface 22b by allowing, out of the first and second resins, at least the first resin to melt, flow, and solidify. The inside corner 10a is formed by the principal surface portion 22 of the first resin sheet 21 and the end surface portion 24 of the second resin sheet 23. This increases the joint area between the end surface portion 24 of the second resin sheet 23 and the principal surface portion 22 of the first resin sheet 21 and enables successful welding of the first and second resin sheets 21 and 23.

The weld overlay portion 27 may have any shape. For example, as shown in FIG. 4A, a joint 10E may be formed including a weld overlay portion 27E that has a concave surface when the inside corner 10a is viewed, or as shown in FIG. 4B, a joint 10F may be formed including a weld overlay portion 27F that has a convex surface when the inside corner 10a is viewed.

When measured from the weld recess 25 and determined regardless of the direction of measurement, the minimum thickness $t_3$ of the joint 10 is preferably 0.1 mm or more, more preferably 0.3 mm or more. In this regard, the preferred lower limit of the minimum thickness $t_3$ of the joint 10 may be 0.1 mm or 0.10 mm. The minimum thickness $t_3$ of the joint 10 measured from the weld recess 25 may be smaller than 0.1 mm. However, when the minimum thickness $t_3$ of the joint 10 is 0.1 mm or more, the joint 10 can have a sufficient thickness (sufficient total thickness of the first and second resin sheets 21 and 23) even at and near the weld recess 25 so that the first resin will be less likely to break at the joint 10. On the other hand, when measured from the weld recess 25, the minimum thickness $t_3$ of the joint 10 preferably has an upper limit of 2.0 mm, more preferably an upper limit about 0.1 mm smaller than the thickness of the sheet (the thickness of the first resin sheet 21). For example, in a case where the first resin sheet 21 has a thickness of 1.5 mm, the upper limit of the minimum thickness $t_3$ of the joint 10 may be 1.4 mm when set approximately 0.1 mm smaller than the thickness of the sheet. For example, in a case where the first resin sheet 21 has a thickness of 1.0 mm, the upper limit of the minimum thickness $t_3$ of the joint 10 may be 0.9 mm. When the upper limit of the minimum thickness $t_3$ of the joint 10 measured from the weld recess 25 is 2.0 mm or approximately 0.1 mm smaller than the thickness of the sheet, the first and second resin sheets 21 and 23 will be joined with high strength because of ease of pushing the resin during the formation of the weld recess 25.

When measured at the bottom of the weld recess 25 of the joint 10, the minimum thickness $t_4$ of the first resin in the thickness direction of the first resin sheet 21 is preferably 0.1 mm or more, more preferably 0.3 mm or more. In this regard, the preferred lower limit of the minimum thickness $t_4$ of the first resin may be 0.1 mm or 0.10 mm. The minimum thickness $t_4$ of the first resin at the bottom of the weld recess 25 may be smaller than 0.1 mm. However, when the minimum thickness $t_4$ of the first resin is 0.1 mm or more, the first resin will be less likely to break at the joint 10. On the other hand, when the minimum thickness $t_4$ of the first resin at the bottom of the weld recess 25 is set to 2.0 mm or less, more preferably 1.0 mm or less, the first and second resin sheets 21 and 23 can be joined with higher work efficiency because of ease of pushing the resin during the formation of the weld recess 25. In such a case, the end surface portion 24 of the second resin sheet 23 can also be easily melted by ultrasound U vibrations when the joining structure 1 is formed using ultrasonic welding described later. The minimum thickness $t_4$ of the first resin in the thickness direction of the first resin sheet 21 is often the thickness of the first resin sheet 21 measured at the deepest part of the bottom 26 of the weld recess 25. Alternatively, the minimum thickness $t_4$ of the first resin may be the thickness of the first resin sheet 21 measured at any other position.

In the joint 10, the principal surface portion 22 of the first resin sheet 21 and the end surface portion 24 of the second resin sheet 23 are preferably mated together at an angle in the range of 45° or more and 90° or less, more preferably in the range of 60° or more and 90° or less as measured on the acute angle side. When the principal surface portion 22 of the first resin sheet 21 and the end surface portion 24 of the second resin sheet 23 are mated together at an angle in such a range, the resin being pushed in the depth direction of the weld recess 25 will be easily allowed to melt and flow toward both sides of the end surface portion 24 of the second resin sheet 23.

2. Electrical Wire Sheath

An electrical wire sheath 30 including the joining structure 1 is provided, which is to be provided around an electrical wire 4.

Figure 5:
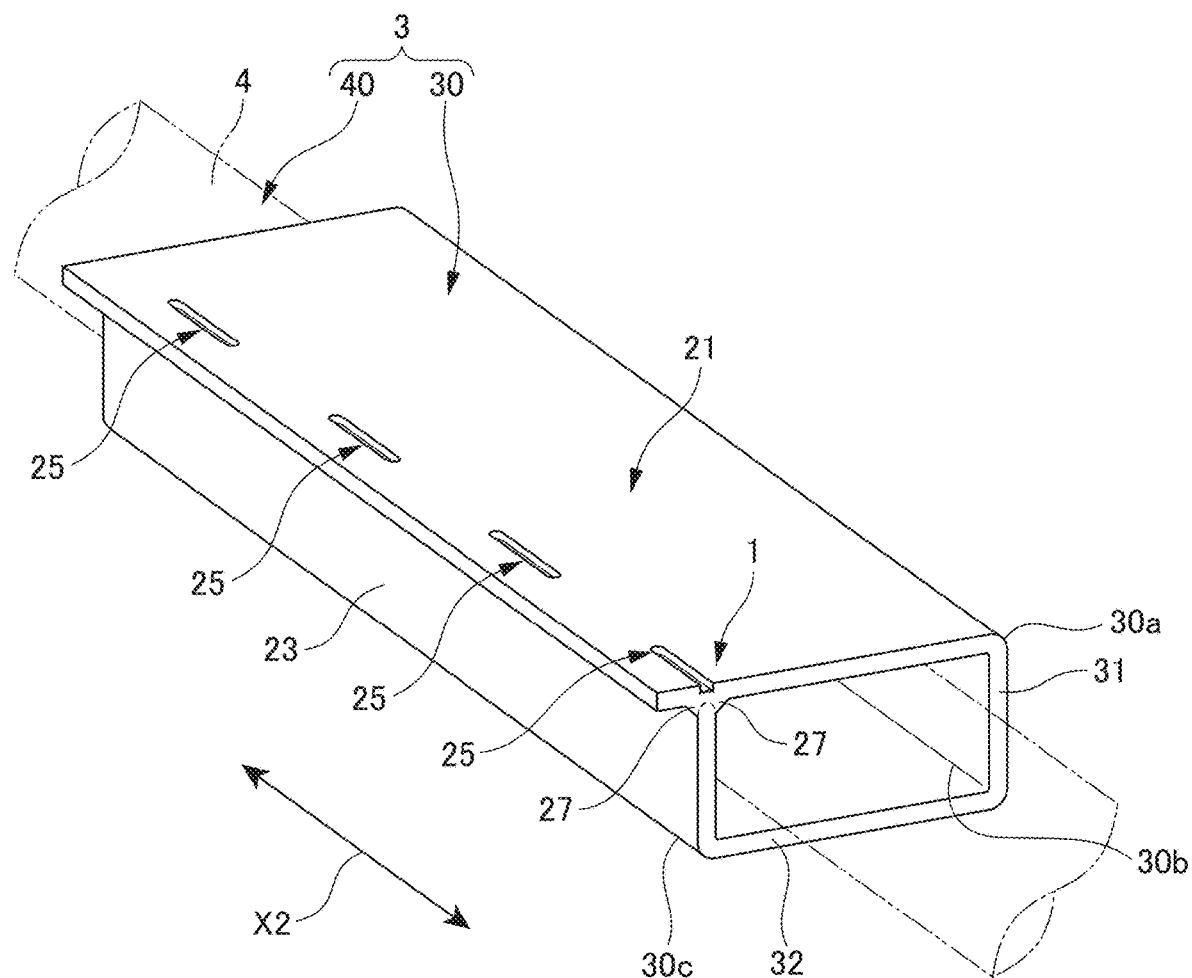
FIG. 5 is a schematic perspective view of the structure of an electrical wire sheath.

Hereinafter, the electrical wire sheath 30 will be specifically described with reference to the drawings. FIG. 5 is a schematic perspective view of the structure of the electrical wire sheath 30. The electrical wire sheath 30 includes a wall 31 extending along the longitudinal direction X2 of the electrical wire 4 and has a housing 32 that is formed by the wall 31 surrounding the space to accommodate the electrical wire 4. The electrical wire sheath 30 including the joining structure 1 can be formed by joining the resin sheets with high work efficiency without using excessive portions of the resin sheets for the joint. Thus, the resulting electrical wire sheath 30 is light-weight and suitable for protecting the electrical wire 4. The electrical wire 4 shown in FIG. 5 is in the form of a single cylinder. Alternatively, the electrical wire 4 may be replaced by a bundle of two or more electrical wires, such as a wire harness, or a branched wire if necessary.

The electrical wire sheath 30 may have any shape. For example, as shown in FIG. 5, the wall 31 of the electrical wire sheath 30 may include a single resin sheet folded to form multiple corners 30a, 30b, and 30c. In this case, the wall 31 of the electrical wire sheath 30 is preferably shaped to surround the entire circumference of the electrical wire 4. The electrical wire sheath 30 including a single resin sheet as shown above can be formed more efficiently by joining a smaller number of portions of the resin sheet.

3. Sheathed Wire Harness

The present invention provides a sheathed wire harness 3 including: a wire harness 40 including an electrical wire 4; and the electrical wire sheath 30 described above, in which the electrical wire sheath 30 is provided around the wire harness 40. In this structure, the electrical wire sheath 30 protects at least part of a bundle of electrical wires in the wire harness 40 or at least part of a group of electrical wires including multiple separate bundles of electrical wires branched and extending from a bundle of electrical wires.

4. Method for Producing Joining Structure

Next, a method for producing the joining structure 1 will be described. FIG. 6 is a flowchart of a method for producing the joining structure 1. The production method includes: a positioning step ST1 including mating and positioning a bottom surface 22b of a principal surface portion 22 of a first resin sheet 21 including a first resin and an end surface portion 24 of a second resin sheet 23 including a second resin; a welding horn pressing step ST2 including pressing a leading end 51 of a welding horn 5 against a top surface 22a of the principal surface portion 22 of the first resin sheet 21 while the principal surface portion 22 of the first resin sheet 21 is mated with the end surface portion 24 of the second resin sheet 23; and a joint forming step ST3 including welding the principal surface portion 22 of the first resin sheet 21 and the end surface portion 24 of the second resin sheet 23, which are mated together, to form a joint 10 using ultrasound U emitted from the welding horn 5.

First, provided are a first resin sheet 21 including a first resin and a second resin sheet 23 including a second resin. The first resin of the first resin sheet 21 is preferably a foamed resin. When the first resin sheet 21 includes a foamed resin, the first resin will be easy to push in the depth direction of the weld recess 25 and will shrink while releasing air bubbles during the joint forming step ST3, which includes melting the first resin using ultrasound U and follows the welding horn pressing step ST2 described below including pressing the leading end 51 of the welding horn 5 against the first resin sheet 21. This will facilitate the solidification of the welded resin and prevent the first resin from melting and flowing more than necessary, so that the first resin will be less likely to flow out of the joint 10. On the other hand, the second resin of the second resin sheet 23 may be any of a non-foamed resin and a foamed resin.

The first and second resin sheets 21 and 23 are subjected to the positioning step ST1. The positioning step ST1 includes mating and positioning the bottom surface 22b of the principal surface portion 22 of the first resin sheet 21 including the first resin and the end surface portion 24 of the second resin sheet 23 including the second resin. For example, in the production of the electrical wire sheath 30 including the joining structure 1, the positioning step ST1 may include positioning the first and second resin sheets 21 and 23 such that a housing 32 of a desired size will be formed in a desired position for accommodating an electrical wire 4.

In the positioning step ST1, the principal surface portion 22 of the first resin sheet 21 and the end surface portion 24 of the second resin sheet 23 may be positioned using a means for holding them in a predetermined position, such as a dedicated positioning jig formed to conform to the shape and dimensions of the resin sheets, in such a way that while the principal surface portion 22 of the first resin sheet 21 is brought into contact with the end surface portion 24 of the second resin sheet 23, the positional relationship between them is fixed.

Figure 7A:
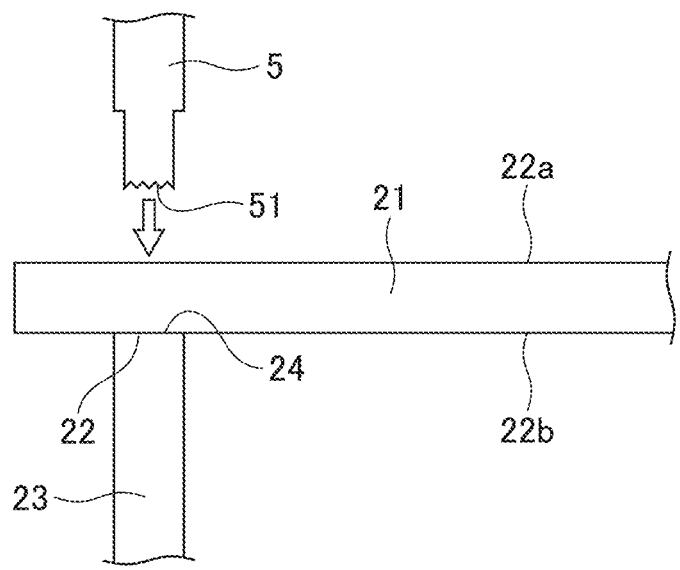
FIGS. 7A, 7B, and 7C are schematic diagrams for illustrating a method for producing a joining structure and for illustrating an example of the welding horn pressing step and an example of the joint forming step.
Figure 7B:
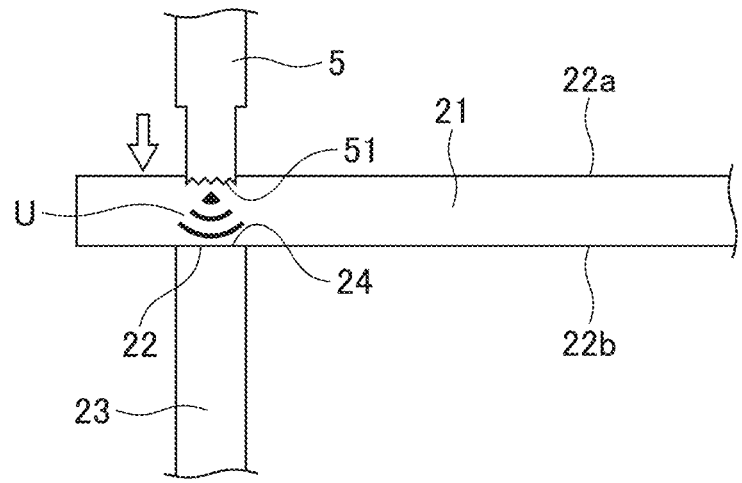
Figure 7C:
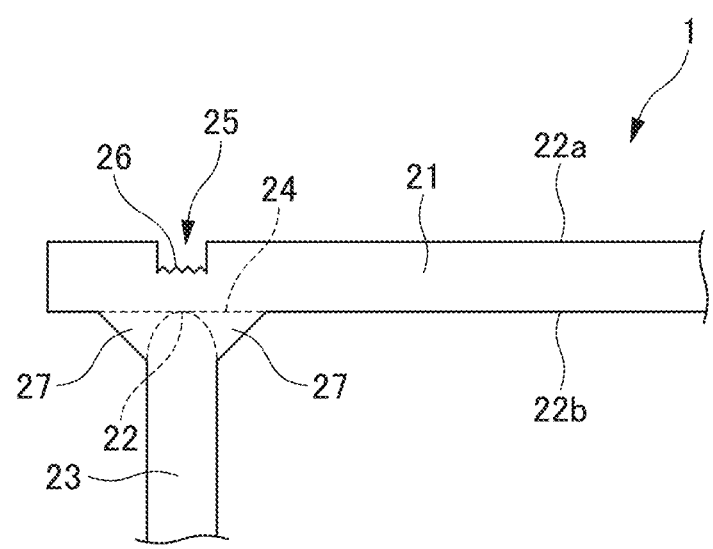

FIGS. 7A, 7B, and 7C are schematic diagrams for illustrating a method for producing the joining structure and for illustrating an example of the welding horn pressing step and an example of the joint forming step. The positioning step ST1 is followed by the welding horn pressing step ST2, which includes, as shown in FIG. 7A, pressing a leading end 51 of a welding horn 5 against the top surface 22a of the principal surface portion 22 of the first resin sheet 21 while the principal surface portion 22 of the first resin sheet 21 is mated with the end surface portion 24 of the second resin sheet 23. Thus, the leading end 51 of the welding horn 5 is positioned relative to the principal surface portion 22 of the first resin sheet 21 and the end surface portion 24 of the second resin sheet 23.

The leading end 51 of the welding horn 5 preferably has a convex protrusion shape. This feature makes the welding horn 5 less likely to deform at its base and allows a large force per unit area to act on the principal surface portion 22 of the first resin sheet 21 during the welding horn pressing step ST2, which includes pressing the leading end 51 of the welding horn 5 against the principal surface portion 22 of the first resin sheet 21, so that the first resin will be easily pushed in the depth direction of the weld recess 25 during the joint forming step ST3 described later, which includes forming the weld recess 25.

Figure 8A:
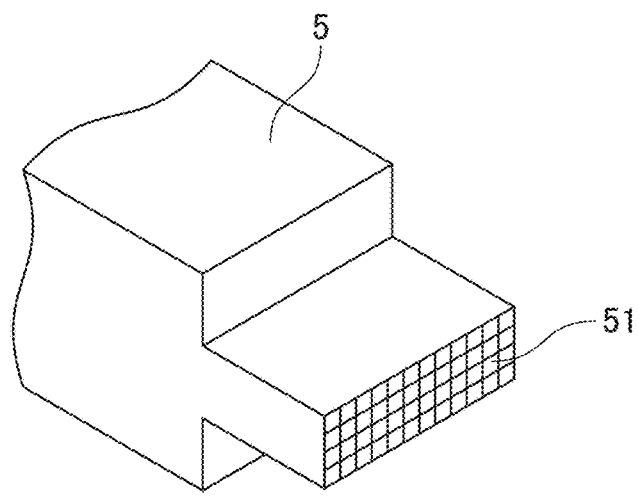
Figure 8B:
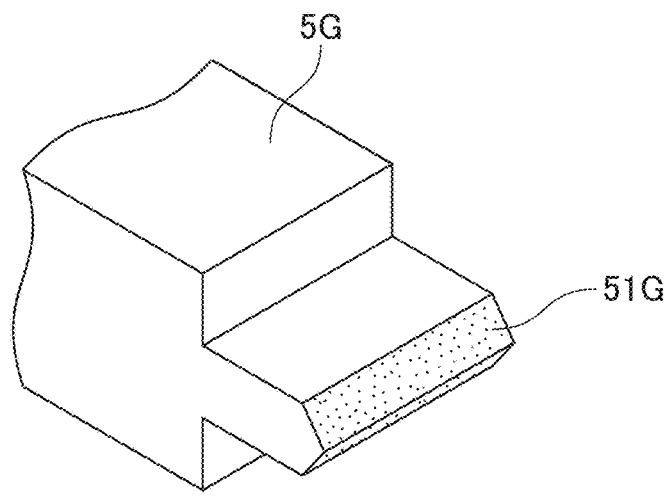
Figure 8C:
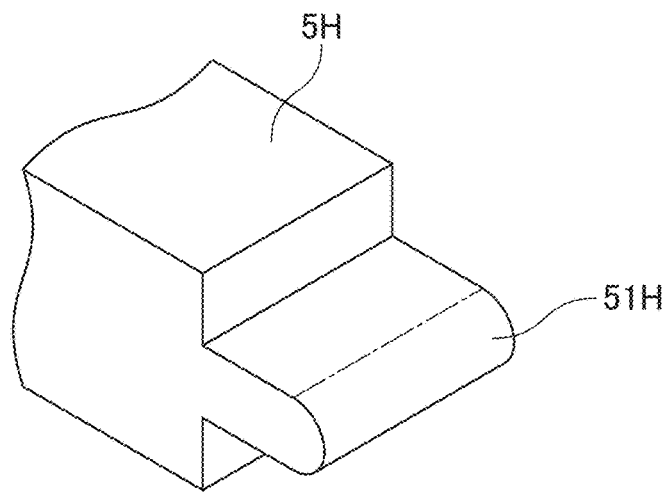

FIGS. 8A, 8B, and 8C are schematic diagrams each showing an example of the geometry of the leading end of a welding horn for use in the method for producing a joining structure according to another embodiment. FIG. 8A shows the structure of a welding horn having a leading end surface with bumps and dents formed by knurling. FIG. 8B shows the structure of a welding horn, of which the leading end has a convex protrusion with top surface irregularities formed by blasting. FIG. 8C shows the structure of a welding horn, of which the leading end has a convex protrusion with a convex top surface formed by filleting.

As shown in FIG. 8A, the leading end 51 of the welding horn 5 may have multiple bumps and dents formed on at least part of its surface by spline or diamond knurling. Alternatively, as shown in FIG. 8B, the leading end 51G of the welding horn 5G may have a convex protrusion, and at least part of the surface of the leading end 51G may have irregularities formed by blasting. Thanks to the bumps and dents or irregularities on the surface of the leading end 51 or 51G of the welding horn 5 or 5G, the leading end 51 or 51G can come into contact with the first resin sheet 21 in a small area so that the contact pressure on the first resin sheet 21 can concentrate on the dent portions and that ultrasound U vibrations can also concentrate on the dent portions during the joint forming step ST3 described later. As a result, at least the first resin can be easily pushed in the depth direction of the weld recess 25.

Alternatively, as shown in FIG. 8C, at least part of the surface of the leading end 51H of the welding horn 5H may be a curved surface, and more specifically, the leading end 51H may have a convex protrusion with a convex chamfered top surface formed by filleting. Such a curved surface of the leading end 51 of the welding horn 5 can come into contact with the first resin sheet 21 in a small area so that the contact pressure on the first resin sheet 21 can concentrate on the top and that ultrasound U vibrations can also concentrate on the top during the joint forming step ST3 described later. As a result, at least the first resin can be easily pushed in the depth direction of the weld recess 25. Moreover, thanks to the curved surface of the leading end 51, the top of the leading end 51 can be pushed shallowly into the first resin sheet 21 when the top of the curved surface of the leading end 51 is pressed against the overlap between the principal surface portion 22 of the first resin sheet 21 and the end surface portion 24 of the second resin sheet 23. As a result, the thickness of the first resin sheet 21 at the formed weld recess 25 (specifically, the minimum thickness $t_3$ of the first resin sheet 21 measured from the weld recess 25) can be easily set as desired.

Next, as shown in FIG. 7B, the joint forming step ST3 is performed, which includes welding the principal surface portion 22 of the first resin sheet 21 and the end surface portion 24 of the second resin sheet 23, which are mated together, to form a joint 10 using ultrasound U emitted from the welding horn 5. Vibrations caused by the ultrasound U emitted from the welding horn 5 allow, out of the first and second resins, at least the first resin to heat and melt, and the melted resin is pushed by the welding horn 5. In this step, part of the end surface portion 24 of the second resin sheet 23 may be allowed to melt together with the first resin so that a mixture of the second resin and the first resin being pushed may be formed. The resin being pushed is allowed to melt and flow in the vicinity of the end surface portion 24 of the second resin sheet 23 and to form a weld at the inside corner 10a between the bottom surface 22b of the principal surface portion 22 and the end surface portion 24 of the second resin sheet 23, which results in the formation of the joint 10. In this step, the welding horn 5 is pressed against a portion of the top surface 22a of the principal surface portion 22 of the first resin sheet 21, and the weld recess 25 is formed at that portion. Together with the weld recess 25, the weld overlay portion 27 is formed at the inside corner 10a, which is formed between the bottom surface 22b of the principal surface portion 22 and the end surface portion 24 of the second resin sheet 23.

In this way, the joining structure 1 is obtained in which the joint 10 has the weld recess 25, which is formed on the top surface 22a of the principal surface portion 22 of the first resin sheet 21, and the weld overlay portion 27, which is formed at the inside corner 10a of the joint 10 on the bottom surface 22b of the principal surface portion 22 by allowing, out of the first and second resins, at least the first resin to melt, flow, and solidify.

While some embodiments of the present invention have been described above, it will be understood that the embodiments are not intended to limit the present invention and may be altered or modified in various ways within the scope of the present invention which will encompass all modes within the concept of the present invention and the scope of claims.

EXAMPLES

Next, inventive examples (examples according to the present invention) and comparative examples will be described to further clarify the advantageous effects of the present invention. It should be noted that the inventive examples are not intended to limit the present invention.

Inventive Example 1

A foamed resin sheet made of a foamed polypropylene resin with a density of 480 kg/m$^3$ was used for both the first and second resin sheets 21 and 23. The thickness $t_1$ of the first resin sheet 21 and the thickness $t_2$ of the second resin sheet 23 were both 1.5 mm. The first and second resin sheets 21 and 23 were colored differently so that it could be easily checked how they were welded together.

The positioning step ST1 was performed on the first and second resin sheets 21 and 23, in which the bottom surface 22b of the principal surface portion 22 of the first resin sheet 21 made of the first resin was mated at a right angle with the end surface portion 24 of the second resin sheet 23 made of the second resin, they were positioned using a positioning jig while they were in contact with each other, and the positional relationship between them was maintained. In other words, the mating angle between the principal surface portion 22 of the first resin sheet 21 and the end surface portion 24 of the second resin sheet 23 was 90°.

The welding horn pressing step ST2 was then performed, in which while the principal surface portion 22 of the first resin sheet 21 was mated with the end surface portion 24 of the second resin sheet 23, the leading end 51 of the welding horn 5 was pressed against the top surface 22a of the principal surface portion 22 of the first resin sheet 21. As shown in FIG. 8A, the leading end 51 of the welding horn 5 used had a convex protrusion with a 2.4 mm wide, 8.0 mm long top surface having bumps and dents formed by diamond knurling with a module (m) of 0.2 according to JIS B 0951. The leading end 51 of the welding horn 5 was pressed against the first resin sheet 21 and the second resin sheet 23 such that the width (transverse) direction of the leading end 51 matched the thickness direction of the second resin sheet 23. During the pressing, equal portions of the leading end 51 of the welding horn 5 were allowed to protrude from the second resin sheet 23 in its thickness direction.

While the leading end 51 of the welding horn 5 was pressed against the first resin sheet 21 and the second resin sheet 23, the joint forming step ST3 was performed using ultrasound U emitted from the welding horn 5. A small welder (P128 (model number) manufactured by Ultrasonic Engineering Co., Ltd.) was used for the emission of ultrasound U from the welding horn 5. The ultrasound U was emitted at a power of 100 W and a frequency of 28 kHz for 0.9 seconds. The welding horn 5 was thrust to a depth of 0.75 mm to weld the first and second resin sheets 21 and 23 so that the joint 10 was formed to produce the joining structure 1.

Figure 9:
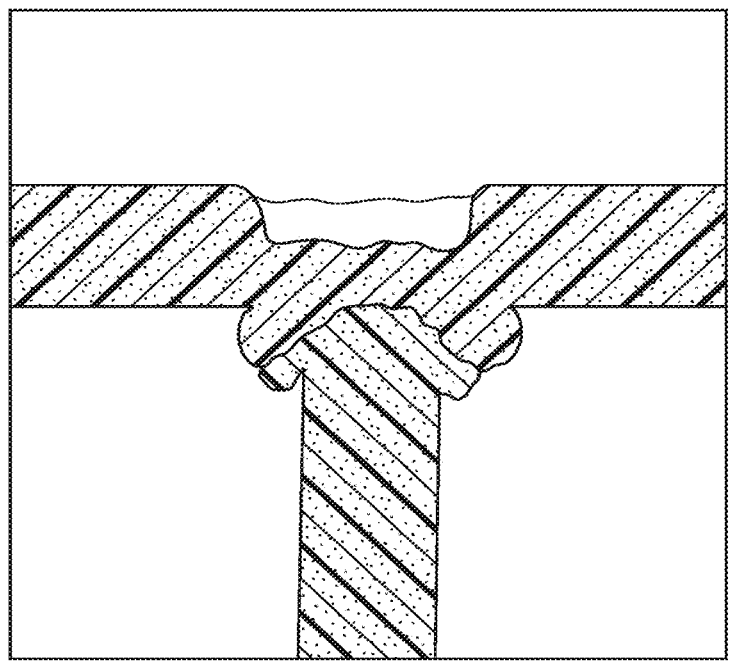
FIG. 9 is a view obtained by observing a cross-section of a joining structure of Inventive Example 1, which is perpendicular to first and second resin sheets of the joining structure.

FIG. 9 shows the result of observing a cross-section of the resulting joining structure 1, which is perpendicular to the first and second resin sheets. The result of the observation shown in FIG. 9 indicates that in the joint forming step ST3, the first resin of the first resin sheet 21 and the second resin of the second resin sheet 23 were locally melted by heating caused by ultrasound U emission and that the melted first resin with reduced air voids was pushed by the welding horn 5. It was also found that while forming a mixture with the melted second resin, the first resin being pushed was allowed to melt and flow in the vicinity of the end surface portion 24 of the second resin sheet 23 and fused to form a weld overlay portion 27 at the inside corner 10a between the bottom surface 22b of the principal surface portion 22 and the end surface portion 24 of the second resin sheet 23.

The joint 10 of the resulting joining structure 1 had a weld recess 25 on the top surface 22a of the principal surface portion 22 of the first resin sheet 21, and the bottom 26 of the weld recess 25 had bumps and dents in a grid pattern. The width and length of the bottom 26 of the weld recess 25 were approximately the same as those of the leading end 51 of the welding horn 5. Specifically, the width w of the bottom 26 of the weld recess 25 was around 2.4 mm in the thickness direction of the second resin sheet 23.

In the resulting joining structure 1, the minimum thickness $t_3$ of the joint 10 measured from the weld recess 25 was 0.75 mm regardless of the direction of measurement. The position of the top of the end surface portion 24 of the second resin remained substantially the same as the original position of the principal surface portion 22 of the first resin sheet 21 before the formation of the joint 10, and the minimum thickness $t_4$ of the first resin measured at the deepest part of the bottom 26 of the weld recess 25 was 0.75 mm in the thickness direction of the first resin sheet 21.

The joint strength of the resulting joining structure 1 was measured by pulling apart the joint 10 in the depth direction of the weld recess 25 using an Autograph tensile tester manufactured by Shimadzu Corporation (model number: AGS-X, 10 N to 10 kN). The measured joint strength was 147 N.

Inventive Example 2

A joining structure 1 was produced as in Inventive Example 1 except that the leading end 51 of the welding horn 5 used had a convex protrusion with a 2.0 mm wide, 8.0 mm long top surface having bumps and dents formed by diamond knurling with a module (m) of 0.2 according to JIS B 0951.

As in Inventive Example 1, the joint 10 of the resulting joining structure 1 had a weld recess 25 on the top surface 22a of the principal surface portion 22 of the first resin sheet 21, and the bottom 26 of the weld recess 25 had bumps and dents in a grid pattern. The width and length of the bottom 26 of the weld recess 25 were approximately the same as those of the leading end 51 of the welding horn 5. Specifically, the width w of the bottom 26 of the weld recess 25 was around 2.0 mm in the thickness direction of the second resin sheet 23.

In the resulting joining structure 1, the minimum thickness $t_3$ of the joint 10 measured from the weld recess 25 was 0.75 mm regardless of the direction of measurement. The minimum thickness $t_4$ of the first resin measured at the deepest part of the bottom 26 of the weld recess 25 was 0.75 mm in the thickness direction of the first resin sheet 21.

The joint strength of the resulting joining structure 1 was 143 N as measured in the same way as in Inventive Example 1.

Inventive Example 3

A joining structure 1 was produced as in Inventive Example 1 except that the leading end 51 of the welding horn 5 used had a convex protrusion with a 1.6 mm wide, 8.0 mm long top surface having bumps and dents formed by diamond knurling with a module (m) of 0.2 according to JIS B 0951.

As in Inventive Example 1, the joint 10 of the resulting joining structure 1 had a weld recess 25 on the top surface 22a of the principal surface portion 22 of the first resin sheet 21, and the bottom 26 of the weld recess 25 had bumps and dents in a grid pattern. The width and length of the bottom 26 of the weld recess 25 were approximately the same as those of the leading end 51 of the welding horn 5. Specifically, the width w of the bottom 26 of the weld recess 25 was around 1.6 mm in the thickness direction of the second resin sheet 23.

In the resulting joining structure 1, the minimum thickness $t_3$ of the joint 10 measured from the weld recess 25 was 0.75 mm regardless of the direction of measurement. The minimum thickness $t_4$ of the first resin measured at the deepest part of the bottom 26 of the weld recess 25 was 0.75 mm in the thickness direction of the first resin sheet 21.

The joint strength of the resulting joining structure 1 was 123 N as measured in the same way as in Inventive Example 1.

Inventive Example 4

A joining structure 1 was produced as in Inventive Example 1 except that as shown in FIG. 8B, the leading end 51G of the welding horn 5G used had a 0.5 mm long, angle protrusion whose cross-section was 2.0 mm wide and 8.0 mm long and whose top surface had irregularities formed by blasting.

As in Inventive Example 1, the joint 10 of the resulting joining structure 1 had a weld recess 25 on the top surface 22a of the principal surface portion 22 of the first resin sheet 21, and the bottom 26 of the weld recess 25 had geometries directly transferred from the angle protrusion of the welding horn 5. The dimensions and shape of the bottom 26 of the weld recess 25 were approximately the same as those of the leading end 51 of the welding horn 5. Specifically, the width w of the bottom 26 of the weld recess 25 was around 2.0 mm in the thickness direction of the second resin sheet 23.

In the resulting joining structure 1, the minimum thickness $t_3$ of the joint 10 measured from the weld recess 25 was 1.00 mm regardless of the direction of measurement. The minimum thickness $t_4$ of the first resin measured at the deepest part of the bottom 26 of the weld recess 25 was 0.75 mm in the thickness direction of the first resin sheet 21.

The joint strength of the resulting joining structure 1 was 135 N as measured in the same way as in Inventive Example 1.

Inventive Example 5

A joining structure 1 was produced as in Inventive Example 1 except that as shown in FIG. 8C, the leading end 51H of the welding horn 5H used had a convex protrusion whose cross-section was 2.0 mm wide and 8.0 mm long and which had a convex top surface with a height of 0.5 mm formed by 1.0 mm radius filleting.

As in Inventive Example 1, the joint 10 of the resulting joining structure 1 had a weld recess 25 on the top surface 22a of the principal surface portion 22 of the first resin sheet 21, and the bottom 26 of the weld recess 25 had geometries directly transferred from the convex protrusion of the welding horn 5. The dimensions and shape of the bottom 26 of the weld recess 25 were approximately the same as those of the leading end 51 of the welding horn 5. Specifically, the width w of the bottom 26 of the weld recess 25 was around 2.0 mm in the thickness direction of the second resin sheet 23.

In the resulting joining structure 1, the minimum thickness $t_3$ of the joint 10 measured from the weld recess 25 was 0.90 mm regardless of the direction of measurement. The minimum thickness $t_4$ of the first resin measured at the deepest part of the bottom 26 of the weld recess 25 was 0.75 mm in the thickness direction of the first resin sheet 21.

The joint strength of the resulting joining structure 1 was 146 N as measured in the same way as in Inventive Example 1.

Inventive Example 6

A joining structure 1 was produced as in Inventive Example 1 except that the welding horn 5 was thrust to a depth of 1.45 mm when the joint 10 was formed.

The joint 10 of the resulting joining structure 1 had a weld recess 25 on the top surface 22a of the principal surface portion 22 of the first resin sheet 21, and the bottom 26 of the weld recess 25 had bumps and dents in a grid pattern. The width and length of the bottom 26 of the weld recess 25 were approximately the same as those of the leading end 51 of the welding horn 5. Specifically, the width w of the bottom 26 of the weld recess 25 was around 2.4 mm in the thickness direction of the second resin sheet 23.

In the resulting joining structure 1, the minimum thickness $t_3$ of the joint 10 measured from the weld recess 25 was 0.05 mm regardless of the direction of measurement. The position of the top of the end surface portion 24 of the second resin remained substantially the same as the original position of the principal surface portion 22 of the first resin sheet 21 before the formation of the joint 10, and the minimum thickness $t_4$ of the first resin measured at the deepest part of the bottom 26 of the weld recess 25 was 0.05 mm in the thickness direction of the first resin sheet 21.

The joint strength of the resulting joining structure 1 was 70 N as measured in the same way as in Inventive Example 1.

Inventive Example 7

A joining structure 1 was produced as in Inventive Example 1 except that the thickness $t_1$ of the first resin sheet 21 was 3.0 mm, the thickness $t_2$ of the second resin sheet 23 was 1.5 mm, and the welding horn 5 was thrust to a depth of 0.90 mm when the joint 10 was formed.

The joint 10 of the resulting joining structure 1 had a weld recess 25 on the top surface 22a of the principal surface portion 22 of the first resin sheet 21, and the bottom 26 of the weld recess 25 had bumps and dents in a grid pattern. The width and length of the bottom 26 of the weld recess 25 were approximately the same as those of the leading end 51 of the welding horn 5. Specifically, the width w of the bottom 26 of the weld recess 25 was around 2.4 mm in the thickness direction of the second resin sheet 23.

In the resulting joining structure 1, the minimum thickness $t_3$ of the joint 10 measured from the weld recess 25 was 2.10 mm regardless of the direction of measurement. The position of the top of the end surface portion 24 of the second resin remained substantially the same as the original position of the principal surface portion 22 of the first resin sheet 21 before the formation of the joint 10, and the minimum thickness $t_4$ of the first resin measured at the deepest part of the bottom 26 of the weld recess 25 was 2.10 mm in the thickness direction of the first resin sheet 21.

The joint strength of the resulting joining structure 1 was 12 N as measured in the same way as in Inventive Example 1.

Comparative Example 1

In Comparative Example 1, the joining structure shown in FIG. 11 of Patent Document 2 was formed. Through holes were formed in the first resin sheet 21, and protrusions were formed on the top of the end surface portion 24 of the second resin sheet 23. Each of the protrusions had a wide head and a narrow neck. The wide head formed the top of the protrusion, and the narrow neck connected the head to the surface of the first resin sheet 21 to be mated. Next, the head and then neck of each protrusion were inserted through each through hole of the principal surface portion 22 of the first resin sheet 21 from the bottom surface side while both ends of the wide head of the protrusion were folded, so that the end surface portion 24 of the second resin sheet 23 was mated at a right angle with the first resin sheet 21. Both ends of the head were then unfolded to the original state, so that a joining structure was formed, in which the necks of the protrusions passed through the through holes.

In Comparative Example 1, the formation of the protrusions on the top of the end surface portion 24 of the second resin sheet 23 required a larger resin sheet than in Inventive Examples. The joint strength of the resulting joining structure was up to 93 N as measured in the same way as in Inventive Example 1.

Comparative Example 2

In Comparative Example 2, holes were formed in the first resin sheet 21, and protrusions were formed on the top of the end surface portion 24 of the second resin sheet 23. Next, the protrusions on the end surface portion 24 of the second resin sheet 23 were inserted through the holes of the principal surface portion 22 of the first resin sheet 21 from the bottom surface side, so that the end surface portion 24 of the second resin sheet 23 was mated at a right angle with the first resin sheet 21. Portions of the protrusions on the end surface portion 24 of the second resin sheet 23, which protruded from the holes of the principal surface portion 22 of the first resin sheet 21, were melted by heating so that caulking was performed to fix the end surface portion 24 of the second resin sheet 23 to the principal surface portion 22 of the first resin sheet 21.

In Comparative Example 2, the formation of the protrusions on the top of the end surface portion 24 of the second resin sheet 23 also required a larger resin sheet than in Inventive Examples. The joint strength of the resulting joining structure was up to 120 N as measured in the same way as in Inventive Example 1.

As shown above, the joining structures 1 of Inventive Examples 1 to 7 all had a joint strength of more than 10 N and were successfully formed by joining the first and second resin sheets 21 and 23 with no need to use excessive portions of the resin sheets for the joint, such as portions for forming the protrusions on the top of the end surface portion 24 of the second resin sheet 23. Moreover, when the joining structures of Inventive Examples 1 to 7 were produced, the first and second resin sheets 21 and 23 were joined with high work efficiency by welding using ultrasound U emitted from the welding horn 5.

Thus, the joining structures 1 of Inventive Examples 1 to 7 were produced by joining the resin sheets with high work efficiency without using excessive portions of the resin sheets for the joint.

In particular, the joining structures 1 of Inventive Examples 1 to 5, in which the minimum thickness $t_4$ of the first resin in the thickness direction of the first resin sheet 21 was in the range of 0.1 mm or more and 2.0 mm or less as measured at the bottom of the weld recess 25, had a high joint strength over 120 N, which indicated that the resin sheets were strongly joined together. This suggests that the minimum thickness $t_4$ of the first resin in the thickness direction of the first resin sheet 21 should preferably be in the range of 0.1 mm or more and 2.0 mm or less as measured at the bottom of the weld recess 25 particularly in order to make it possible to increase the joint strength and to strongly join the resin sheets without using excessive portions of the resin sheets for the joint.

On the other hand, when the joining structures of Comparative Examples 1 and 2 were produced, protrusions had to be formed on the top of the end surface portion 24 of the second resin sheet 23 in order to join the first and second resin sheets 21 and 23 together, which meant that larger resin sheets were necessary.

EXPLANATION OF REFERENCE NUMERALS 1, 1A to 1F: Joining structure
10, 10A to 10F: Joint
10a: Inside corner on bottom surface of joint
21, 21A to 21D: First resin sheet
22: Principal surface portion of first resin sheet
22a: Principal surface portion (top surface) of first resin sheet
22b: Principal surface portion (bottom surface) of first resin sheet
23: Second resin sheet
24: End surface portion of second resin sheet
25, 25A to 25F: Weld recess
26, 26A to 26F: Bottom of weld recess
27, 27E, 27F: Weld overlay portion
3: Sheathed wire harness
30: Electrical wire sheath
30a to 30c: Corner formed by folding
31: Wall
32: Housing
4: Electrical wire
40: Wire harness
5, 5G, 5H: Welding horn
51, 51G, 51H: Leading end of welding horn
$t_1$: Thickness of first resin sheet
$t_2$: Thickness of second resin sheet
$t_3$: Minimum thickness of first resin sheet measured from weld recess
$t_4$: Minimum thickness of first resin measured at bottom of weld recess
U: Ultrasound
X1: Thickness direction of second resin sheet
X2: Longitudinal direction of electrical wire

The invention claimed is:

1. A joining structure comprising: a first resin sheet comprising a first resin; a second resin sheet comprising a second resin; and a joint formed by mating and welding a principal surface portion of the first resin sheet and an end surface portion of the second resin sheet,
the first resin being a foamed resin,
the second resin being a non-foamed or foamed resin,
the joint having a weld recess on a top surface and comprising a weld overlay portion formed at an inside corner on a bottom surface by allowing, out of the first and second resins, at least the first resin to melt, flow, and solidify.

2. The joining structure according to claim 1, wherein the first resin in the joint has a minimum thickness in a range of 0.1 mm or more and 2.0 mm or less as measured at a bottom of the weld recess.

3. The joining structure according to claim 1, wherein the joint has a minimum thickness of 0.1 mm or more as measured from the weld recess.

4. The joining structure according to claim 1, wherein the principal surface portion of the first resin sheet and the end surface portion of the second resin sheet are mated together at an angle in a range of 45° or more and 90° or less as measured on an acute angle side.

5. The joining structure according to claim 1, wherein one or both of the first and second resins comprise a polypropylene resin.

6. An electrical wire sheath to be provided around an electrical wire,
the electrical wire sheath comprising the joining structure according to claim 1.

7. A sheathed wire harness comprising: a wire harness; and the electrical wire sheath according to claim 6 that is provided around the wire harness.

8. A method for producing a joining structure, the method comprising:
a positioning step comprising mating and positioning a bottom surface of a principal surface portion of a first resin sheet comprising a first resin and an end surface portion of a second resin sheet comprising a second resin;
a welding horn pressing step comprising pressing a leading end of a welding horn against a top surface of the principal surface portion of the first resin sheet while the principal surface portion of the first resin sheet is mated with the end surface portion of the second resin sheet; and
a joint forming step comprising welding the principal surface portion of the first resin sheet and the end surface portion of the second resin sheet, which are mated together, to form a joint using ultrasound emitted from the welding horn
wherein the first resin is a foamed resin,
wherein the second resin is a non-foamed or foamed resin, and
wherein the joint has a weld recess on the top surface and comprises a weld overlay portion formed at an inside corner on the bottom surface by allowing, out of the first and second resins, at least the first resin to melt, flow, and solidify.

9. The method according to claim 8 for producing a joining structure, wherein the leading end of the welding horn has a convex protrusion shape.

10. The method according to claim 8 for producing a joining structure, wherein the leading end of the welding horn has a surface curved at least partially.

11. The method according to claim 8 for producing a joining structure, wherein the leading end of the welding horn has a surface at least part of which has a plurality of bumps and dents.

* * * * *